United States Patent
Zhu

(10) Patent No.: US 6,215,623 B1
(45) Date of Patent: Apr. 10, 2001

(54) DYNAMIC-ABSORBER FOR THE SUPPRESSION OF SUSPENSION VIBRATIONS

(75) Inventor: Li-Yan Zhu, San Jose, CA (US)

(73) Assignee: Headway Technologies, Inc., Milpitas, CA (US)

(*) Notice: Subject to any disclaimer, the term of this patent is extended or adjusted under 35 U.S.C. 154(b) by 0 days.

(21) Appl. No.: 09/332,381

(22) Filed: Jun. 14, 1999

Related U.S. Application Data

(62) Division of application No. 08/998,633, filed on Dec. 29, 1997, now Pat. No. 5,949,617.

(51) Int. Cl.[7] ........................................ G11B 5/48
(52) U.S. Cl. ............................................. 360/244.3
(58) Field of Search .................... 360/104–106, 360/109, 240, 260, 244.3, 244.4

(56) References Cited

U.S. PATENT DOCUMENTS

| | | | |
|---|---|---|---|
| 4,703,470 | 10/1987 | Castagna et al. ............ | 369/215 |
| 4,760,478 * | 7/1988 | Pal et al. .................... | 360/244.3 |
| 4,932,019 | 6/1990 | Bessho ....................... | 369/247 |
| 5,594,607 * | 1/1997 | Erpelding et al. ............ | 360/244.3 |
| 5,606,477 * | 2/1997 | Erpelding et al. ............ | 360/244.3 |
| 5,734,526 * | 3/1998 | Symons ....................... | 360/104 |
| 5,825,590 * | 10/1998 | Ohwe .......................... | 360/104 |
| 5,850,319 * | 12/1998 | Tangren ....................... | 360/104 |
| 5,894,655 * | 4/1999 | Symons ....................... | 360/104 |

* cited by examiner

Primary Examiner—Allen T. Cao
(74) Attorney, Agent, or Firm—George O. Saile; Stephen B. Ackerman

(57) ABSTRACT

A rotary actuated arm assembly for positioning a tranducer over a data track of a rotating magnetic disk includes an extended load beam having an etched cavity along its top surface and shaped to function as a dynamic absorbing member for absorbing undesirable vibrations and resonances occurring in high speed mechanisms such as disk drives.

8 Claims, 3 Drawing Sheets

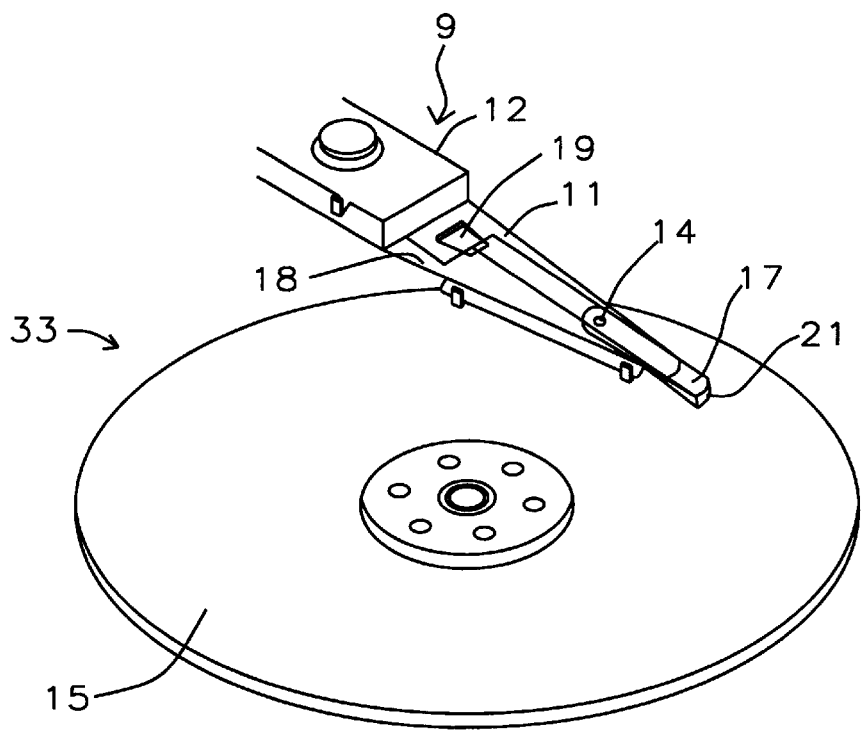
FIG. 1
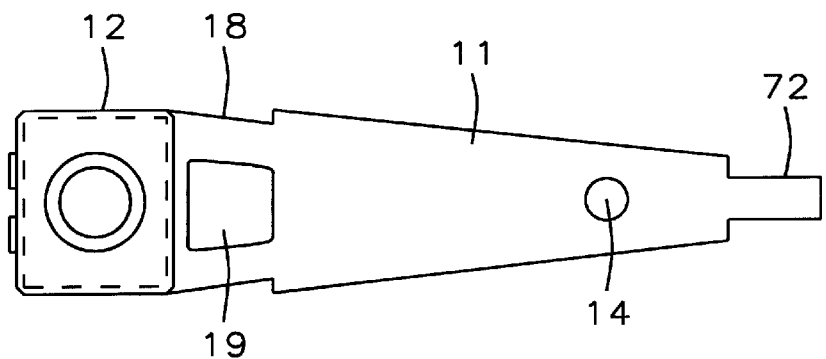
FIG. 2 – Prior Art
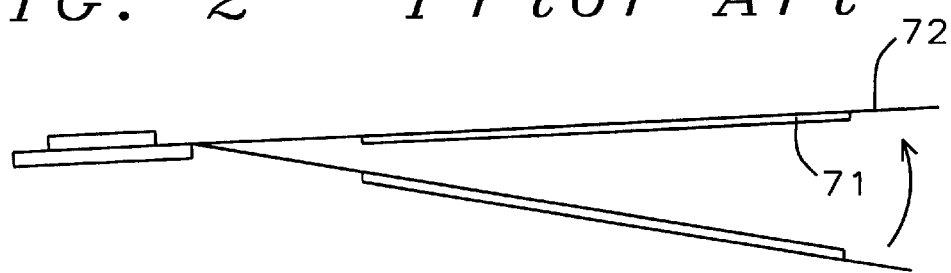
FIG. 3 – Prior Art

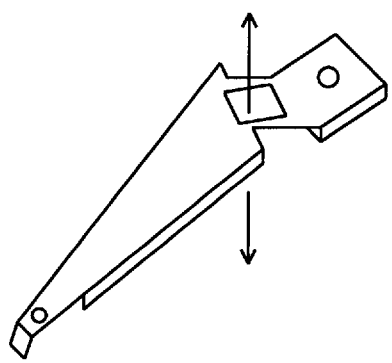
FIG. 4A – Prior Art
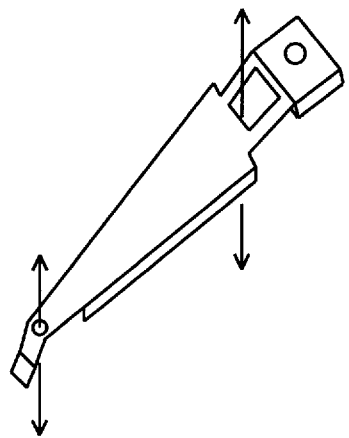
FIG. 4B – Prior Art
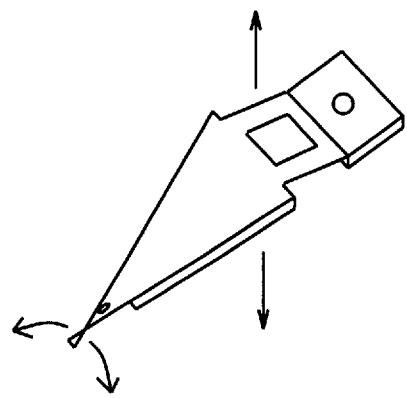
FIG. 4C – Prior Art

DYNAMIC-ABSORBER FOR THE SUPPRESSION OF SUSPENSION VIBRATIONS

This is a division of U.S. patent application Ser. No. 08/998,633, filing date Dec. 29, 1997, U.S. Pat. No. 5,949,617 A Dynamic-Absorber For The Suppression Of Suspension Vibtrations, assigned to the same assignee as the present invention.

BACKGROUND OF THE INVENTION (1). Technical Field

This invention relates to the field of disk drives, in particular, to a method for absorbing unwanted vibrations and resonances in dynamic mechanisms, such as disk drives, is fabricated with an integral dynamic absorber that can be formed where the vibration is to be suppressed. The absorbing system is disposed at a predetermined location on a load beam suspension.

(2). Description of the Prior Art

The following two documents relate to methods dealing with vibration suppression of head suspension assemblies.

U.S. Pat. No. 4,932,019 issued Jun. 5, 1990 to A. Bessho describes a vibration absorbing member for reducing resonance energy in an optical disk drive, but it also is used in conjunction with a drive base and not a head suspension assembly as in the invention.

U.S. Pat. No. 4,703,470 issued Oct. 27, 1987 to Castagna, et al, discloses a dynamic absorber used in a disk drive, but the absorber described has a viscoelastic link element between the absorber base and absorber mass, and is only described as being used on the drive carriage or base casting.

It is well known that high speed mechanisms having moving parts are susceptible to damaging vibratory effects which reduce the expected life of the mechanism. As an example, disk drives which use actuators and associated suspensions for bidirectional accessing of data tracks of a rotating disk suffer from undesirable vibrations and resonances. In the past the designer would add visco-elastic dampers to the suspension. However, outgassing would often occur with visco-elastic dampers creating friction polymers on the slider/disk interface thereby causing premature failure of the disk drive system.

Furthermore, a major objective for improved performance of disk drives is to achieve reduction in the access time of the rotating disk. The access time is dependent upon the mass of the suspension assembly. Thus, it is desirable to reduce the mass of the suspension assembly. The reduction of mass, if not correctly accomplished, may in effect increase the access time due to the increased severity of the structural resonances of the suspension.

Several methods dealing with vibration absorbing devices have been employed in the past to damp unwanted resonance frequencies of dynamic operating mechanisms. The absorbing devices are designed to undergo a resonance at a predetemined frequency which is related to the undesired resonance frequency. Such prior art devices are overly sensitive when undergoing assembly and handling and are not considered reliable since they may fail mechanically during operation.

In a hard disk drive, typically a head slider is positioned by a head suspension assembly (HSA) over a magnetic disk to facilitate reading and writing of information to the disk. The constituent elements of standard HSAs include a swage plate, a resilient zone, a load beam, a flexure and a head slider. The swage plate is positioned at a proximal end of the load beam, adjacent to the resilient zone and is mounted to the suspension by means of a boss and by laser welding. The swage plate provides stiffness to the rear mount section and is configured for mounting the load beam to an actuator arm of a disk drive. The flexure is positioned at a distal end of the load beam. Mounted to the flexure is a head slider with a read/write orientation with respect to an associated disk.

SUMMARY OF THE INVENTION

It is and object of the invention to provide a novel and improved dynamic absorber for reducing unwanted vibrations, resonances, and noise in high speed mechanisms, such as disk drives.

It is another object of the invention is to provide a dynamic absorber that does not add mass to the disk drive system thereby achieving reduction in the access time of the magnetic heads to selected data tracks of the rotating disk.

It is another object of the invention to provide a dynamic absorber that does not require additional process, material, or assembly. It is essentially free after the initial development and setup.

It is still another object of the invention not to introduce foreign material into the disk drive. It will not outgass, corrode, wear, or fall off the suspension.

The foregoing objects of the invention are accomplished and the disadvantages of the prior art overcome by the provision of a disk drive comprising a dynamic absorber that is constitutively included into a load beam of a head suspension assembly. A load beam is typically made of a sheet of stainless steel. Cavities are often etched out of the suspension for control of stiffness, mode shape, and for mass-reduction. The dynamic absorber can be etched within the load beam configuration and within the shape of the cavity, which as mentioned previously can be reconfigured to include the shape of a dynamic absorber.

When a suspension is designed, the mode-shape and natural frequencies are usually known. They are often predicted by simulation and verified by experiments. If a particular mode is of special concern, a dynamic aborber can be placed at a location where the vibration is to be suppressed. To suppress vertical deflection, the absorber can be a simple cantilever beam, or a cantilever with an enlarged tip. This type of absorber is suitable at the antinodes of the vibration, where the vertical displacement is greatest. To suppress rotation, the absorber can be a T-bar. This type of absorber is suitable at the nodes of the vibration, where the rotation is greatest. The natural frequencies of the absorber should match the mode to be suppressed.

Occasionally the natural frequencies of the absorber need to be adjusted, either due to variation of the suspension thickness, or due to a change in the vibration to be suppressed. The adjustment can be accomplished by creating a cavity at the absorber, for example using a laser beam. The amount of adjustment can be controlled by the location of the cavity. The natural frequency is increased if the cavity is near the free end of the absorber. This novel adjustment scheme overcomes the disadvantage of several prior arts, which failed to achieve desired accuracy in natural frequencies.

BRIEF DESCRIPTION OF THE DRAWINGS

FIG. 1 is a perspective illustration of a typical head suspension assembly used on disk drives.

FIG. 2 shows a top view of a prior art load beam.

FIG. 3 is a side elevation view of the load beam of FIG. 2.

FIG. 4A shows a single vertical vibration mode of a load beam of the prior art.

FIG. 4B shows a double vertical vibration mode of a load beam of the prior art.

FIG. 4C shows a combination of a vertical and rotational vibration modes of a load beam of the prior art.

FIG. 5 illustrates shapes of various dynamic absorbers, of the invention, as applied to load beam suspensions.

DETAILED DESCRIPTION OF THE PREFERRED EMBODIMENT

Figure 5A:
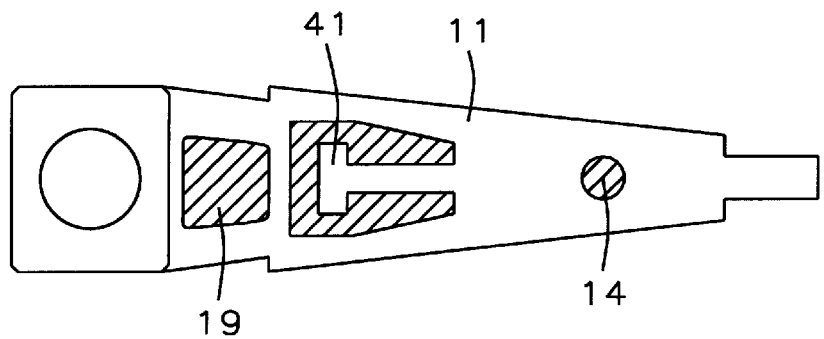
FIG. 5A illustrates a dynamic absorber, of the invention, for the suppression of a vertical vibration as applied to a load beam suspension.

A head suspension assembly with improved vibration dissipating characteristics is described. With reference to FIG. 1, there is shown a perspective view of a head suspension assembly 9 comprising a slider 21 having top, bottom and side surfaces. Along its trailing side surface, a transducer, not shown, is attached so that information can be written and read from the rotating magnetic disk 33, over which the slider flies. Note that the top surface of the slider body is attached to a flexure element 17 which typically comprises a thin piece of metal attached to a load beam 11. Most often both flexure and load beam include various shaped slots which increases their combined flexibility; this is one way that the slider is given freedom of movement to allow for the overall height variations present on the surface of the disk. The load beam 11 is shown mounted to the actuator arm via a swage plate 12.

During operation of the disk drive, the rotating magnetic disk provides an aerodynamic lift force to the slider 21, while an opposing gram load force is applied to the slider through the suspension assembly 9. The equilibrium of the two opposing forces determines the flying height of the slider 21 and its transducer relative to the disk surface 15. For optimum operation, the suspension structure will provide a high first bending mode resonant frequency so that the slider is insensitive to low frequency mechanical disturbance caused by spindle vibration, servo action, and air drag on the suspension, etc.

As the track density of hard disk drives increase, more and more attention needs to be paid to the design of the load beam suspension, since suspension resonances and in-plane suspension motions limit track density. Refer to FIGS. 4A to 4C showing various vibration modes of a typical load beam suspension, though highly exaggerated. In recent years, the trend in load beam suspension design has been toward smaller suspensions, and much research and development work must still be done in the areas of load beam design to reduce sway modes and other undesirable resonances.

Referring now to FIGS. 2 and 3, illustrating, respectively, top and side views of a prior art load beam suspension member 11. The load beam 11 is preferably made in a truncated triangular shape having flanges 71 along its sides and an extending tongue 72 at its narrow end. The side flanges are formed as L-shaped channels to provide rigidity and stiffness to the load beam section. The tongue 72 has a flexure, not shown, that is laser welded to the load beam in the area of an alignment cavity 14.

The leaf spring 18 between the L-shaped channel section 71 and the swage plate 12 is formed often with a trapezoidal-like cutout 19 to provide flexability. The flexible, leaf spring section 18 is formed to provide a desired load force that counteracts the aerodynamic lift force generated by the rotating disk during operation of the disk drive. The load force comes from bending the suspension from the phantom position, shown in FIG. 3, to the raised position as indicated by the arrow.

The vibration of the suspension in magnetic recording drives is extremely harmful. It interferes with the servo performance, and may also cause slider-disk contact which may lead to catastrophic failure. In the prior art, viscoelastic dampers are often applied to the suspension. The increased reflected inertia to the servo actuator, because of the added mass, requires a slower operating speed, hence limiting progression in suspension performance. The viscoelastic dampers also free leaches materials creating friction polymers on the slider/disk interface and causing premature failure.

The invention takes advantage of the following facts. A load beam is typically fabricated from a sheet of stainless steel. Cavities are often etched into the suspension to be used for alignment, stiffness control, and weight reduction.

Figure 5B:
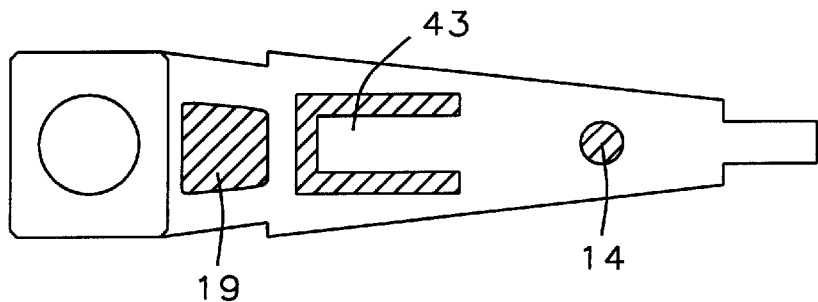
FIG. 5B illustrates a dynamic absorber, of the invention, for the suppression of a vertical vibration as applied to a load beam suspension.
Figure 5C:
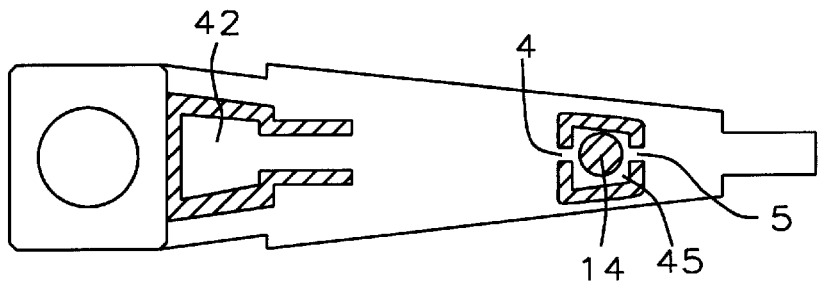
FIG. 5C illustrates a combination of dynamic absorbers, of the invention, for the suppression of a combination of vibrations as applied to load beam suspensions.
Figure 5D:
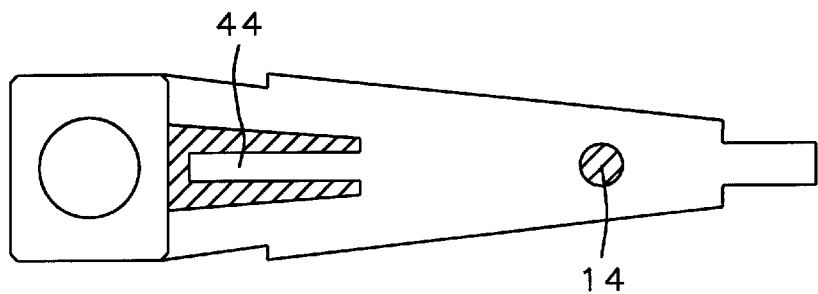
FIG. 5D illustrates a dynamic absorber, of the invention, placed within a location previously occupied by a standard cavity.

When a suspension is designed, the mode shape and natural frequencies are usually known and predicted by simulation and verified by experiments. If a particular mode shape is of special concern, the key aspect of the invention is the addition of a dynamic absorber that can be etched at a location where the vibration is to be suppressed. Some vibration may not coincide with a natural frequency of the head gimbals assembly, but requires suppression because of their large amplitude. For example, the spindle noise and the servo actuator motion may be strong enough to cause concern, even if they do not coincide with one of the suspension resonant frequencies. FIGS. 5A to 5D illustrate various shapes of dynamic absorbers, of the invention, that can be incorporated into the suspension to counterpoise unwanted vibrations. To suppress vertical deflection, the absorber can be a cantilever with an enlarged tip 41, or 42 or a simple cantilever beam as illustrated in 43, or in 44. This type of absorber is suitable at the antinodes of the suspension. To suppress rotation, the absorber shape would take the form of a torsional bar 45 suspended on a pair of pivot hinges 4, and 5. Dynamic absorbers can be placed in combination to suppress both vertical and rotational vibrations as shown in FIG. 5C, or can be placed anywhere along the length of the suspension including within the standard cavity locations taken by trapezoidal-like cutout 19 and alignment cavity 14. In the case of a cantilever beam, the natural frequency of the absorber is proportional to the beam thickness, and inversely proportional to the square of the beam length, independent of the beam width. However, the useful band-width of the absorber increases with the width of the beam. As an example, a 50 $\mu$m thick absorber for the suppression of 4.5 kHz vibration is approximately 3 mm long. If a low-frequency vibration is to be absorbed, the simple cantilever beam may be too long to fit into the load beam. In this case, an enlarged tip may be incorporated. With of without an enlarged tip, this type of absorber is suitable at antinodes of the suspension, where the vertical deflection is greatest.

In manufacturing, the incoming load beam thickness may vary. Thus the natural frequency of an absorber may deviate from desired value. Adjustment may be needed at times. Also in manufacturing, it may be desirable to modify the specification of a suspension. For example, the frequency to be suppressed may change due to a change in the designed disk speed. A novel feature is described herein to facilitate the adjustment and modification. In FIG. 5B, an optional cavity 47 is shown on the cantilever beam 43. When the cavity 47 is located near the tip of the cantilever beam, the natural frequency of the absorber increases. When the cavity is located near the base of the cantilever beam, the natural frequency of the absorber decreases. By the intermediate-value theorem of calculus, the natural frequency can be adjusted continuously within a finite range, by selecting the location of the cavity alone, without changing the cavity size. Obviously, the range of adjustment increases with the cavity size.

While the invention has been particularly shown and described with reference to the preferred embodiments thereof, it will be understood by those skilled in the art that various changes in form and details may be made without departing from the spirit and scope of the invention.

What is claimed is:

1. A head suspension assembly having a dynamic absorbing member for absorbing undesirable vibrations and resonances in high speed mechanisms such as disk drives, the head suspension assembly comprising:

an elongated load beam having a shaped aperture etched through its top surface, said shaped aperture having a continuous perimeter, said perimeter including a member that is patterned to vibrate as a secondary spring mass for absorbing said undesirable vibrations and resonances.

2. The head suspension assembly according to claim 1 wherein said secondary spring mass has a shape of a simple cantilever beam for suppressing an undesirable vertical high-frequency vibration.

3. The head suspension assembly according to claim 1 wherein said secondary spring mass has a shape of a cantilever with an enlarged tip for suppressing an undesirable vertical low-frequency vibration.

4. The head suspension assembly according to claim 1 wherein said secondary spring mass suppresses either a low or high vertical vibration, said shaped aperture with said secondary spring mass is etched at the vibration antinodes of the load beam.

5. The head suspension assembly according to claim 1 wherein said secondary spring mass suppresses an undesirable rotational deflection said secondary spring mass has a shape of a T-bar.

6. The head suspension assembly according to claim 1 wherein said secondary spring mass suppresses an undesirable rotational deflection said shaped aperture with said secondary spring mass is etched at the deflection nodes of the load beam.

7. The head suspension assembly according to claim 1 wherein said secondary spring mass does not add mass to said suspension assembly whereby removing material enhances the disk drives access time.

8. The head suspension assembly according to claim 1 wherein said secondary spring mass eliminates need for additional assembly time as required when adding external dampers such as viscoelastic or adhesive dampers.

* * * * *